US006101189A

United States Patent [19]
Tsuruoka

[11] Patent Number: 6,101,189
[45] Date of Patent: *Aug. 8, 2000

[54] GATEWAY APPARATUS AND PACKET ROUTING METHOD

[75] Inventor: Tetsumei Tsuruoka, Kawasaki, Japan

[73] Assignee: Fujitsu Limited, Kanagawa, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/933,298

[22] Filed: Sep. 18, 1997

[30] Foreign Application Priority Data

Nov. 20, 1996 [JP] Japan .................................. 8-309592

[51] Int. Cl.⁷ .................................................. H04L 12/28
[52] U.S. Cl. .......................... 370/401; 370/392; 370/467
[58] Field of Search .................................. 370/352, 400, 370/401, 402, 392, 469, 331, 467; 395/500; 375/211

[56] References Cited

U.S. PATENT DOCUMENTS

| | | | |
|---|---|---|---|
| 5,347,516 | 9/1994 | Yoshida ................................... | 370/401 |
| 5,442,630 | 8/1995 | Gagliardi et al. ...................... | 370/402 |
| 5,444,703 | 8/1995 | Gagliardi et al. ...................... | 370/401 |
| 5,610,910 | 3/1997 | Focsaneanu et al. .................. | 370/351 |
| 5,737,333 | 4/1998 | Civanlar et al. ....................... | 370/352 |
| 5,790,548 | 8/1998 | Sistanizadeh et al. ................. | 370/401 |
| 5,822,319 | 9/1998 | Nagami et al. ......................... | 370/392 |
| 5,894,478 | 4/1999 | Barzegar et al. ....................... | 370/401 |
| 5,923,659 | 7/1999 | Curry et al. ............................ | 370/401 |

FOREIGN PATENT DOCUMENTS 61-238141  10/1986  Japan .

*Primary Examiner*—Hassan Kizou
*Assistant Examiner*—John Pezzlo
*Attorney, Agent, or Firm*—Helfgott & Karas, P.C.

[57] ABSTRACT

A gateway apparatus and method for routing packets between a local network and an outside network wherein a first converting unit converts a first header of each of packets transmitted from at least one of terminals of the local network to the outside network into a header assigned to the gateway apparatus. A conversion table stores entries referred to by the first converting unit in conversion. A second converting unit converts a second header of packets transmitted by the outside network to the local network into a header for the terminals of the local network. The gateway apparatus operates as a Layer 3 routing apparatus for the local network and operates as a terminal for the outside network.

15 Claims, 20 Drawing Sheets

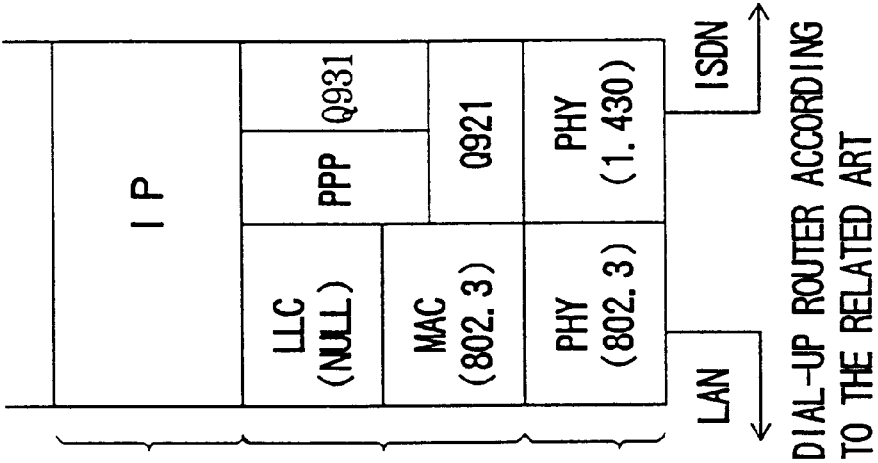
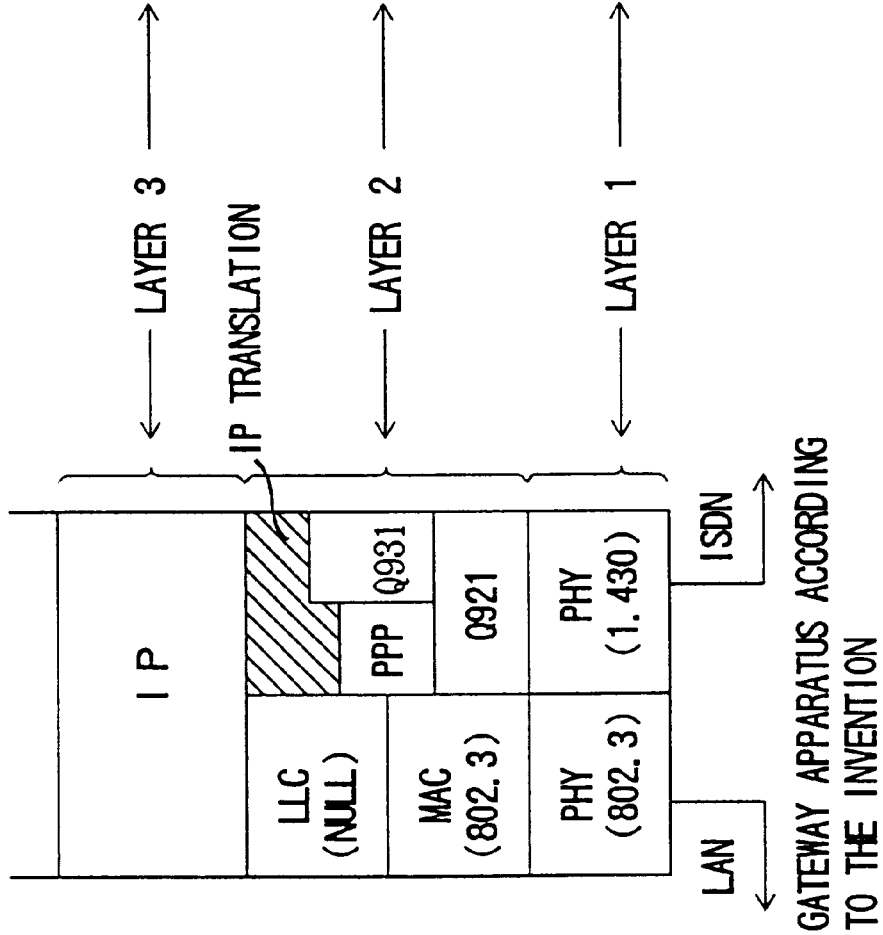

FIG. 10

| | LOCAL NETWORK SIDE | | | | LINE SIDE | REMARKS |
|---|---|---|---|---|---|---|
| SOURCE ADDRESS (SA) | SOURCE PORT NUMBER (SP) | DESTINATION ADDRESS (DA) | DESTINATION PORT NUMBER (DP) | PROTOCOL (PROT) | SOURCE PORT NUMBER (SP') | |
| 192.168.0.2 | 1001 | 128.0.0.1 | 23 | TCP | 1001 | 1 |
| 192.168.0.3 | 1001 | 128.0.0.1 | 23 | TCP | 1002 | 2 |
| 192.168.0.2 | 1002 | 128.0.0.1 | 80 | TCP | 1003 | 3 |
| 192.168.0.2 | 1001 | 128.0.0.1 | 23 | UDP | 1008 | 4 |
| 192.168.0.2 | 1001 | 128.0.0.1 | 23 | TCP | 1005 | 5 |
| 192.168.0.2 | 1001 | 128.0.0.1 | 23 | UDP | 1009 | 6 |

F I G. 1 9

| DESTINATION PORT | PROTOCOL | DESTINATION HOST ADDRESS |
|---|---|---|
| 21 | TCP | 192.168.0.5 |
| 21 | UDP | 192.168.0.5 |
| 23 | TCP | 192.168.0.6 |
| 23 | UDP | 192.168.0.6 |
| 80 | TCP | 192.168.0.6 |
| 80 | UDP | 192.168.0.6 |

GATEWAY APPARATUS AND PACKET ROUTING METHOD

BACKGROUND OF THE INVENTION

1. Field of the Invention

The present invention generally relates to gateway apparatuses and packet routing methods, and more particularly, to a gateway apparatus and a packet routing method for establishing a dial-up connection between a local network comprising a plurality of terminals and an external network, and for routing packets between the local network and the external network.

Recently, the Internet is being used extensively. A user requiring a temporary connection to the Internet usually dials an access point of a provider offering Internet access so as to connect a user terminal to the Internet through the public network. Connection by dialing an access point is referred to as dial-up connection. The number of dial-up connection users is increasing.

FIG. 1 shows a dial-up connection method (packet routing method) according to the related art. Two main modes of dial-up connection are known. The first mode is referred to as dial-up connection of a terminal type (hereinafter, simply referred to as terminal connection). In terminal connection, a single terminal is connected to a desired network (for example, the Internet) through a modem or a terminal adaptor.

The second mode is referred to as dial-up connection of a network type (hereinafter, simply referred to as network connection). In network connection, a connecting end as well as the provider end forms a local network. This local network is connected to an external network on the OSI Network Interface Layer level, using a network routing device such as a dial-up router.

A modem, a terminal adaptor or a dial-up router is substantially equivalent to a gateway apparatus for connecting at least one terminal to an external network.

Usually, in terminal connection, a provider dynamically assigns a Layer 3 address to an accessing terminal. Therefore, the number of terminals connectable to the provider network per a unit time can be set to be greater than the total number of terminals that could potentially access the provider network simultaneously. Thus, the line can be utilized efficiently.

In terminal connection, a terminal is in one-to-one connection with a modem or a terminal adaptor, and if there is only one phone-circuit available, only one terminal can connect to an external network at a given time.

One advantage of terminal connection for a provider is that it is not necessary to manage local networks of users on the provider side and that a relatively large number of users can be accommodated easily. Accordingly, the access charge is relatively inexpensive.

In network connection, a plurality of terminals connected to a local network can communicate with an external network substantially simultaneously. Routing information for the individual terminals in the local network needs to be forwarded to the external network. The external network can distinguish the location of the terminals by the routing information, and can precisely transmit data to the corresponding terminal.

The above-described gateway apparatus and dial-up connection method according to the related art have the following disadvantages.

Terminal connection has a disadvantage in that, from the viewpoint of a user, only a single terminal can be connected to an external network.

Even if a plurality of terminals constitute a local network and the local network is connected to a dial-up connection interface having Network Interface Layer level routing functions, it is impossible for multiple communication sessions to take place simultaneously. In such a system, routing information is not supplied to the provider side. Accordingly, while packets can go out of such a system, no information is available as to where a reply packet from an access destination end system is to be delivered. Therefore, a reply packet can not be received properly by the corresponding terminal.

In order for routing information for individual terminals constituting a local network requesting a dial-up connection to be properly transferred, network connection is essential.

However, in network connection, the external network needs to maintain routing information for the individual terminals constituting the local network on the user side. Accordingly, a unique address unused by any other terminal in the global Internet needs to be assigned to each of the terminals requesting an access. Accordingly, in network connection, it is difficult to assign a Layer 3 address dynamically to the interface on the local network side.

In network connection, both the external network and the local network should be provided with facilities for ensuring that routing information is properly transmitted. Furthermore, advanced network management facilities such as security facilities should come into operation once the local network and the external network are mutually connected so that transparent application-level communication is initiated. Accordingly, due to the managerial complexity, the access charge for network connection is usually more expensive than that for terminal connection.

SUMMARY OF THE INVENTION

Accordingly, an object of the present invention is to provide a gateway apparatus for connecting a user local network constituted of a plurality of terminals to an external communication network by dial-up connection of a terminal type, and for ensuring connectivity similar to network connection.

By using this gateway apparatus, the external network can recognize the user network constituted of a plurality of terminals as one terminal and can establish terminal connection with the user local network. No transmission of routing information takes place.

Each of the terminals in the local network can be connected to the external network as if they are connected to the external network in network connection. Accordingly, the plurality of terminals in the local network can communicate with the external network substantially simultaneously.

Since the load imposed on the external network remains the same as that of terminal connection, the access charge incurred in the above-described arrangement is almost the same as that of terminal connection. The advantage of the above-described arrangement is that a plurality of terminals can communicate with the external network in simulated network connection.

Thus, the gateway apparatus according to the present invention resolves the aforementioned disadvantages.

Describing the advantages of the present invention more specifically, a header of a packet transmitted from a terminal in a local network to an external network is converted into a header assigned to the gateway apparatus. Accordingly, the gateway apparatus operates as a Layer 3 router apparatus for the local network and as a terminal for the external network.

Routing information is not exchanged between the gateway apparatus and the external network.

Thus, the local network accommodating a plurality of terminals can be connected to the external network as if the terminals are connected to the external network in network connection. That is, the plurality of terminals can be simultaneously connected to the external network. An advantage over network connection is that the connection procedure and the connection cost remain substantially the same as the corresponding procedure and cost of terminal connection.

According to another aspect of the present invention, an entry (a set of information in a given table row) in the conversion table that have not been referred to for a predetermined period of time are deleted. Accordingly, the operation of deletion of an entry can define a termination of communication associated with the entry.

According to still another aspect of the present invention, the source upper layer port number is dynamically assigned by the gateway apparatus. Accordingly, even if a plurality of terminals have the same port number, the packets deriving from such terminals can be distinguished from each other easily.

According to yet another aspect of the present invention, an operator can manually instruct dial-up connection to the external network to be started.

According to yet another aspect of the present invention, the gateway apparatus can automatically start dial-up connection to the external network when it receives a packet from a terminal.

According to yet another aspect of the present invention, dial-up connection of the gateway apparatus is terminated when all the entries used in packet routing are deleted. Thus, while the network cannot know disconnection of a communication session, termination of a dial-up connection can be performed efficiently.

According to the yet another aspect of the present invention, the address of the packet received from the external network is translated into a predetermined Layer 3 address not related to the content of the conversion table. Accordingly, when a packet is destined from the external network to the local network for the first time, the packet is converted so that the gateway apparatus of the invention operates as a router for the local network and a terminal for the external network.

According to yet another aspect of the present invention, a delivery failure notice is sent to a terminal originating a packet not subject to conversion. Accordingly, a terminal can recognize that dial-up connection to the external network is disabled.

BRIEF DESCRIPTION OF THE DRAWINGS

Other objects and further features of the present invention will be apparent from the following detailed description when read in conjunction with the accompanying drawings, in which:

FIG. 4A shows a protocol stack for the gateway apparatus according to the present invention;

FIG. 4B shows a protocol stack for the dial-up router according to the related art;

FIG. 10 shows an example of the conversion table used in the gateway apparatus of the present invention;

FIG. 19 shows a destination-port-specific destination host table used in the flowchart of FIG. 18.

DESCRIPTION OF THE PREFERRED EMBODIMENTS

Figure 2:
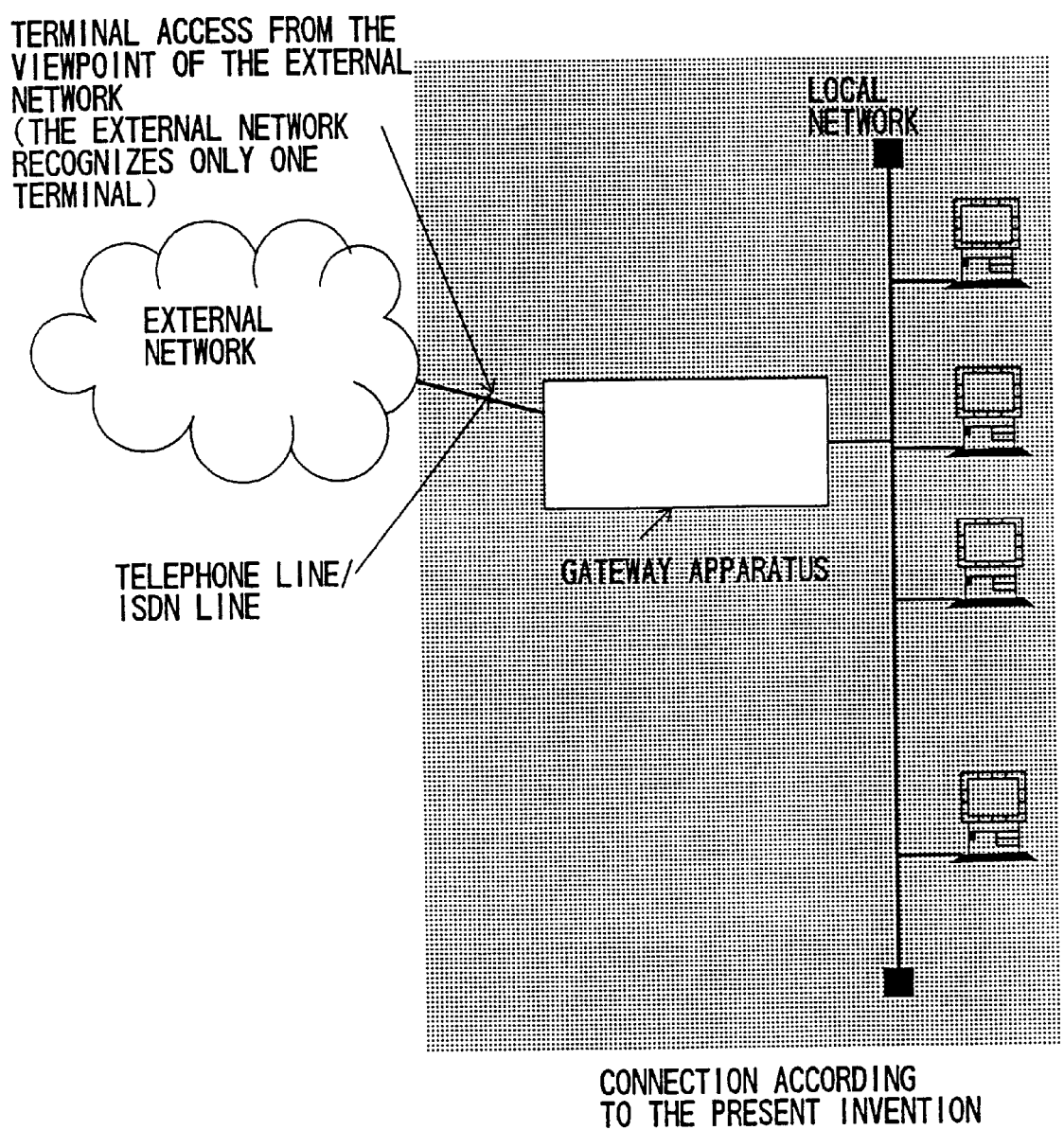
FIG. 2 is a schematic diagram illustrating the principle of the dial-up connection method that uses the gateway apparatus according to the present invention.
Figure 3:
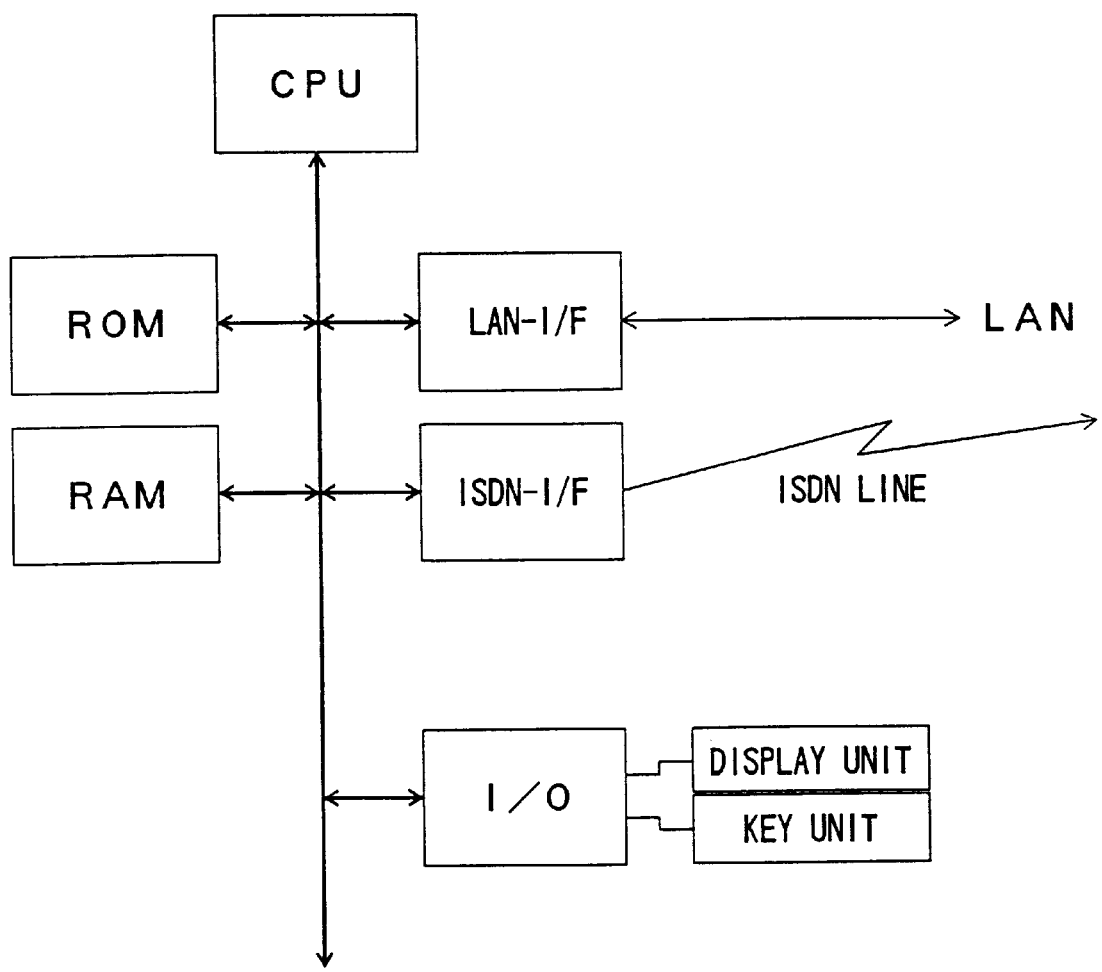
FIG. 3 shows an example of the construction of the gateway apparatus according to the present invention.

First, the principle of the dial-up connection method that uses the gateway apparatus according to the present invention will be described. FIG. 2 is a schematic diagram illustrating the principle of the dial-up connection method (packet routing method) that uses the gateway apparatus according to the present invention. FIG. 3 shows an example of the construction of the gateway apparatus according to the present invention. FIG. 4A shows a protocol stack for the gateway apparatus according to the present invention. FIG. 4B shows a protocol stack for the dial-up router according to the related art. FIGS. 3, 4A and 4B show that the local network interfaces with the external network via an ISDN line.

In the following description of the gateway apparatus according to the present invention, the Internet is used as an example of the external network. But the gateway apparatus according to the present invention can not only be used with the Internet but with various kinds of external networks to communicate therewith.

The gateway apparatus shown in FIG. 3 includes an interface LAN-I/F for the local network (LAN) and a dial-up interface ISDN-I/F for connecting to an external network. The gateway apparatus further includes a microprocessor CPU for processing complicated protocols efficiently, an I/O unit to which a display unit and a key unit (a switch, a button or a keyboard) are connected, and memories ROM and RAM. However, the CPU and the I/O unit are not indispensable elements in this gateway apparatus. The construction described above having two interfaces is substantially same as the conventional dial-up router shown in FIG. 1.

Figure 1:
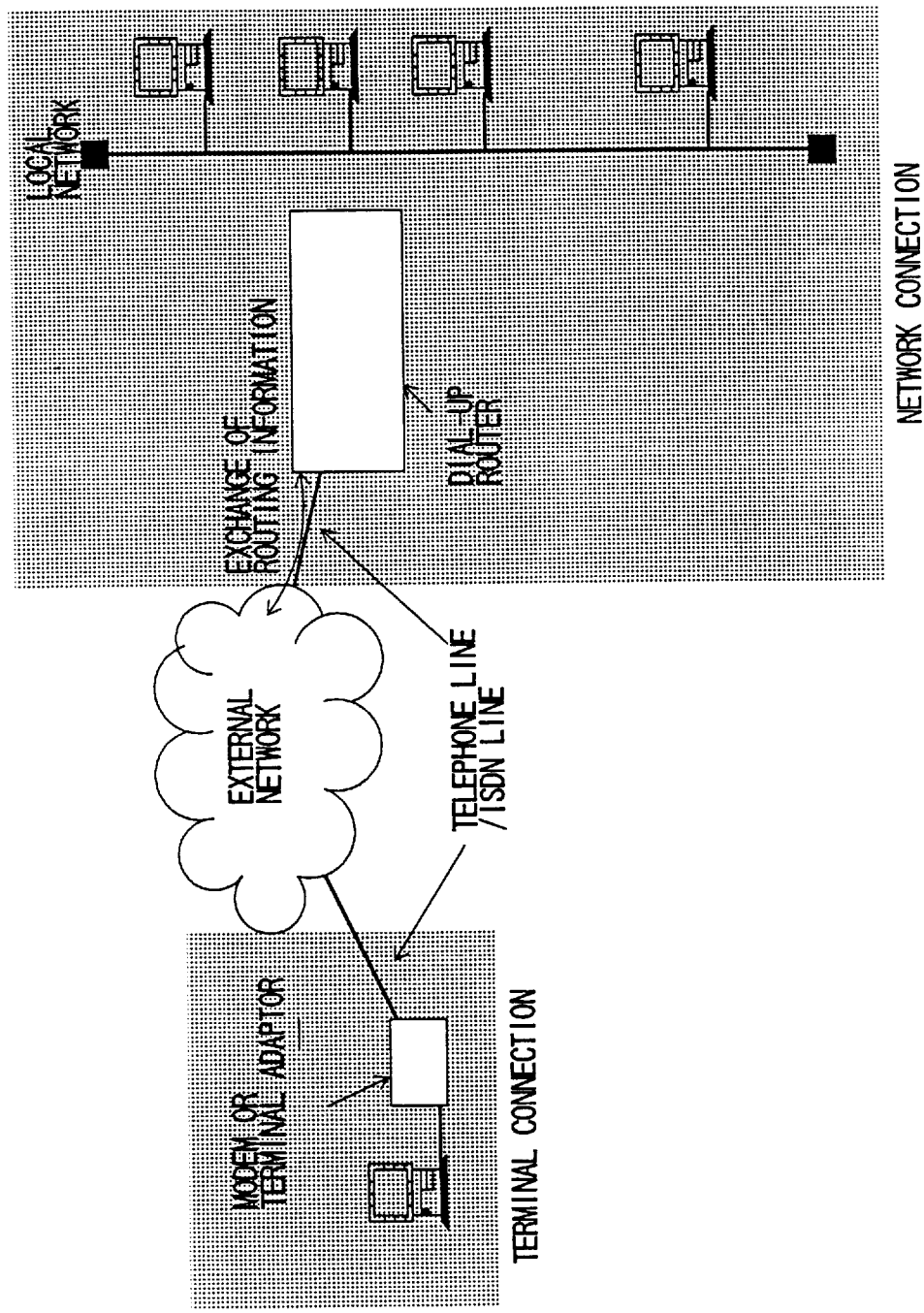
FIG. 1 shows a dial-up connection method according to the related art.

As shown in FIG. 4A, the gateway apparatus according to the present invention has a protocol stack different from that of the conventional dial-up router shown in FIG. 1. Referring to the protocol stacks shown in FIGS. 4A and 4B, both use the Ethernet (Ethernet) IEEE802.3 as a Layer 1 and Layer 2 LAN protocol. Internet protocol (IP) is used as a Layer 3 protocol. Because these protocols are well known, the description thereof is omitted.

As shown in FIG. 4B, I.430 of ISDN-B is used in the conventional dial-up router as a Layer 1 protocol to connect to an external network. Q921, PPP (Point to Point Protocol) are used as Layer 2 protocols for dial up connection to the Internet via a terminal adaptor, and Q.931 for connection establishment. The IP protocol is used as a Layer 3 protocol.

As shown in FIG. 4A, the protocol stack of the gateway apparatus according to the present invention differs from that of the conventional dial-up router in that an IP translation (conversion) function for translating between Layer 3 (IP) and Layer 2 is added.

In the conventional dial-up router, Layer 3 packet routing occurs between the LAN interface and the ISDN interface. In the gateway apparatus according to the present invention, IP translation for packet translation is provided. The gateway apparatus of the invention behaves like an ordinary terminal for a dial-up line and as a router for the local network.

A description will now be given of the IP translation.

An ordinary connection not involving the IP translation will be discussed first. When a terminal accesses an external network by dial-up connection, an application that puts the terminal in a client state is run. In case the external network is the Internet, the TCP/IP protocol is used as a communication protocol, TCP being a Layer 4 protocol and IP being a Layer 3 protocol.

In this case, an access point on the client side is indicated by a Layer 3 address (IP address) and a port number of the upper TCP (or UDP) layer. An access point on the server side (the provider side) is also indicated by a Layer 3 address and a port number.

The port number of the server access point is a number preassigned to a well-known port which indicates an access point dedicated to a particular service. The port number of the client-side access point is assigned within the client application when a communication session is started.

For example, when the local network of the client is constituted of a plurality of terminals, different Layer 3 addresses can be assigned to individual terminals. Further, different upper layer port numbers can be assigned to a given terminal depending on time and access condition.

Thus, application-level communication sessions are differentiated from each other based on a combination of: the Layer 3 address of the client-side access point (in this case, the access point indicates each terminal), the upper layer port number of the client-side access point, the Layer 3 address of the server-side access point, and the upper layer port number of the server-side access point.

A description of the IP translation will now be given. When a packet is transmitted from a terminal on the client side (local network) to the server side (external network), the IP translation in the gateway apparatus provides for conversion of the Layer 3 address of the client side terminal into a Layer 3 address preassigned to the gateway apparatus for connection to the external network. Further, the IP translation dynamically converts the client side upper layer port number attached to the packet into a port number maintained by the gateway apparatus. The packet subject to the above conversion is forwarded to the external network.

When a plurality of terminals in the local network transmit packets to the same server access point, the packets may have the same client side port number. In addition, if the gateway apparatus converts different client side Layer 3 addresses into a specific Layer 3 address, differentiation between the packets is disabled. Accordingly, the client side port number of the packet is converted by the gateway apparatus into a port number maintained by the gateway apparatus.

Any reply from the server is addressed to an access point defined by the Layer 3 address and the port number. The Layer 3 address and the port number of the reply are translated into the Layer 3 address and the port number of the client access point communicating with the server.

When a communication session between a client-side access point and a server-side access point is started by the client side sending a packet, the combination comprising the address of the client-side access point and the server-side access point, and the port number of the client-side access point and the server-side access point depend on the packet transmitted from the client to the server. Therefore, by maintaining the combination of the addresses and the port numbers in the gateway apparatus, subsequent packets transmitted between the client and the server can be easily converted appropriately.

As indicated in FIG. 2, the IP translation function described above ensures that the external network recognizes the gateway apparatus communicating with the external network as a terminal, while the gateway apparatus is actually connected to a plurality of terminals. The IP translation also ensures that the plurality of terminals in the local network can use the external network as if they are accessing the external network via a router. Routing information is not transmitted between the gateway apparatus and the external network.

According to the above-arrangement, no correction is required in programs that are run on the terminals in order to utilize services on the external network (the Internet). As shown in FIGS. 4A and 4B, the protocol stack of the gateway apparatus according to the present invention differs from that of the conventional dial-up router. However, the same hardware configuration can be employed to implement the local network interface (LAN-I/F) and the external network interface (ISDN-I/F).

A further description will now be given of packet routing operation in the gateway apparatus according to the present invention.

Figure 5A:
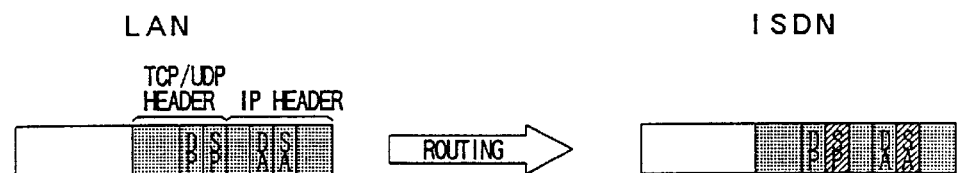
FIG. 5A shows how a packet is transmitted from the local network to the external network.
Figure 5B:
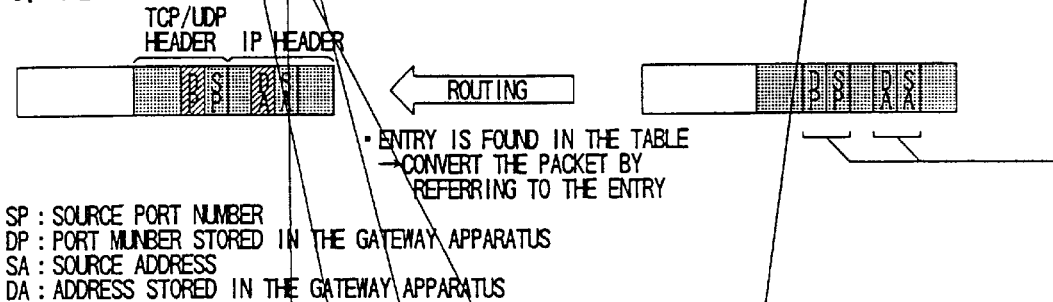
FIG. 5B shows how a packet is transmitted from the external network to the local network.

FIGS. 5A and 5B show how packets are routed through the gateway apparatus according to the present invention.

Figure 5C:
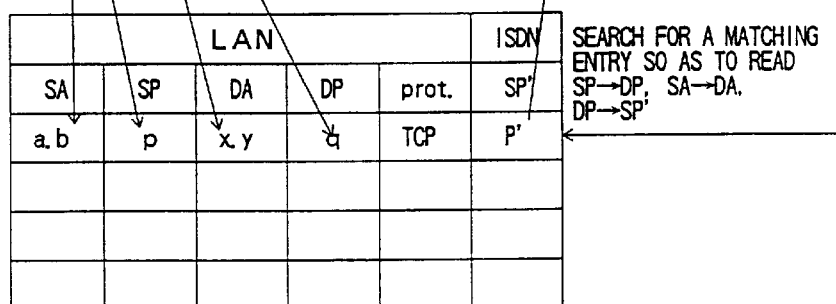
FIG. 5C shows a conversion table employed in the packet routing operation of the invention.

More specifically, FIG. 5A shows how a packet originating in the local network is transmitted to the external network; and FIG. 5B shows how a packet is transmitted from the external network to the local network. FIG. 5C shows a conversion table employed in the packet routing operation of the invention. Hereinafter, the client will be referred to as a source. The source address (SA) of an IP packet comprises a network address "a" and a host address "b". The destination address (DA) of an IP packet also comprises a network address "x" and a host address "y".

Referring to FIGS. 5A and 5C, the conversion table is referred to so as to determine if the conversion table contains an exact combination of the source address (SA), the source port number (SP), the destination address (DA) and the destination port number (DP) of a packet originated in the local network. If there is none, a new combination comprising the checked combination and a unique source port number is created and registered in the table (described again later with reference to FIG. 7). If it is determined that the table contains the matching combination, the packet is translated such that the source port number (SP) is replaced by a port number ("P'" in FIG. 5C) specifically managed by the gateway apparatus of the present invention. With this arrangement, packets originated in terminals in the local network coupled to the gateway apparatus of the present invention can be properly distinguished from each other. The source address (SA) is also replaced by the ISDN-side address of the gateway apparatus.

Referring to FIGS. 5B and 5C, the conversion table is referred to so as to determine if the conversion table contains an exact combination of the addresses and port numbers of a packet arriving from the external network. The source port number (SP) of the arriving packet is checked against the destination port number (DP) in the table; the source address (SA) is checked against the destination address (DA) in the table; and the destination port number (DP) is checked against the external network port number (SP'). If the matching combination is found in the conversion table shown in FIG. 5C, the arriving packet is translated such that the destination port number (DP) is replaced by the source port number (SP) stored in the table at the matching combination; and the destination address (DA) is replaced by the source address (SA) stored in the table at the matching combination.

Figure 6:
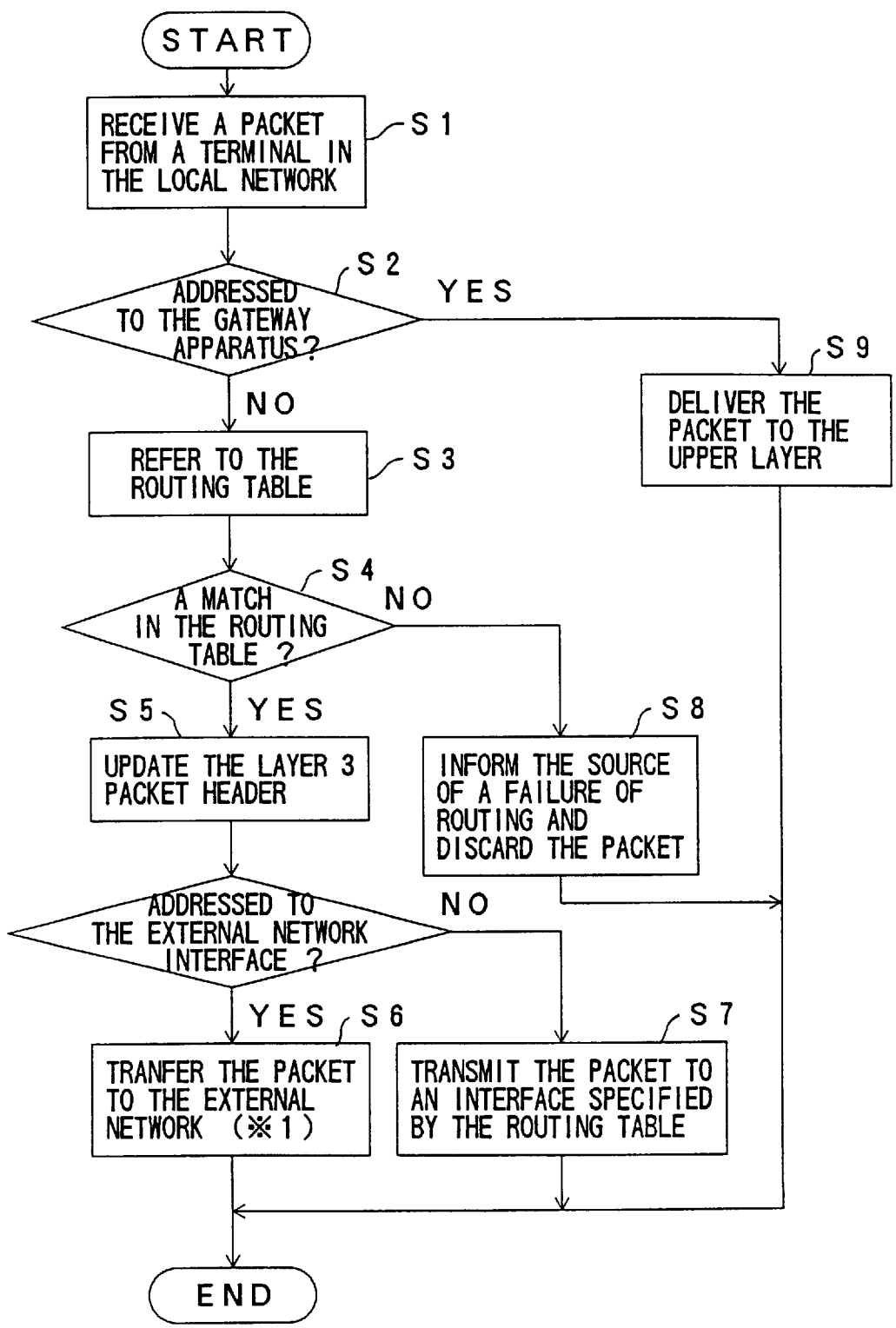
FIG. 6 is a flowchart showing an operation performed by the gateway apparatus when the gateway apparatus receives a packet from a terminal in the local network.
Figure 7:
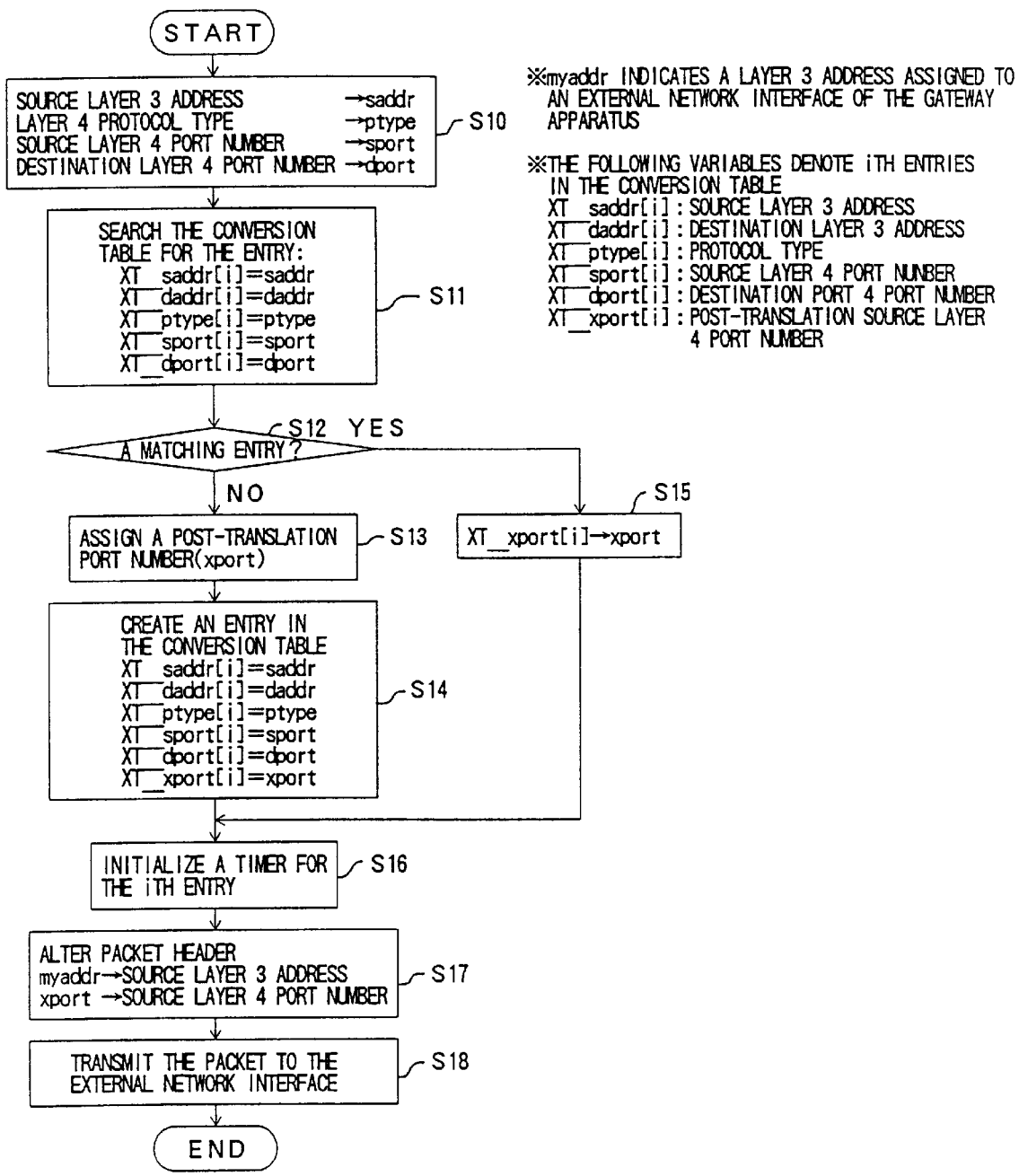
FIG. 7 is a flowchart showing an operation performed by the gateway apparatus for routing a packet transmitted by a terminal in the local network to an external network.
Figure 8:
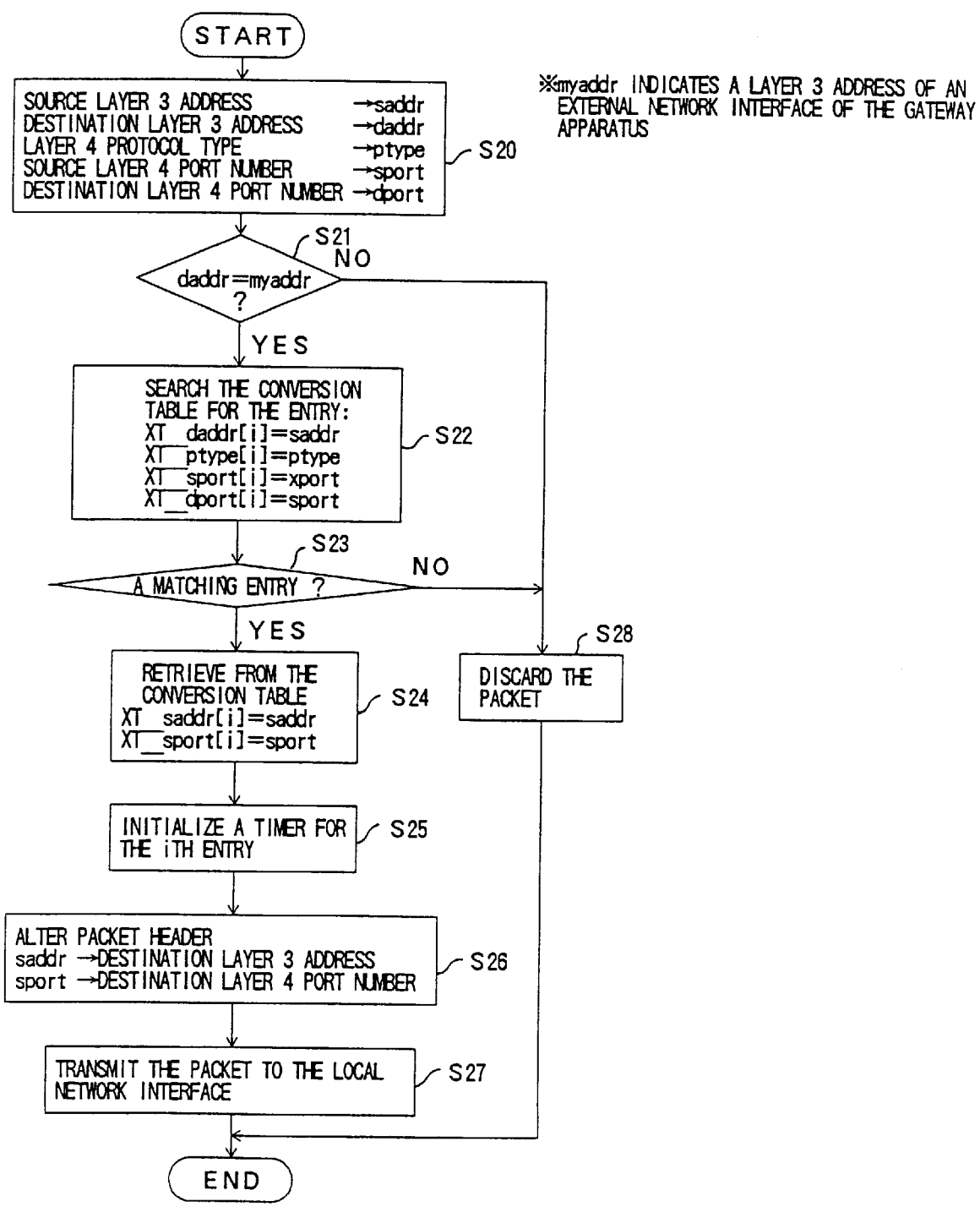
FIG. 8 is a flowchart showing an operation performed by the gateway apparatus for routing a packet from an external network to a terminal in the local network.
Figure 9:
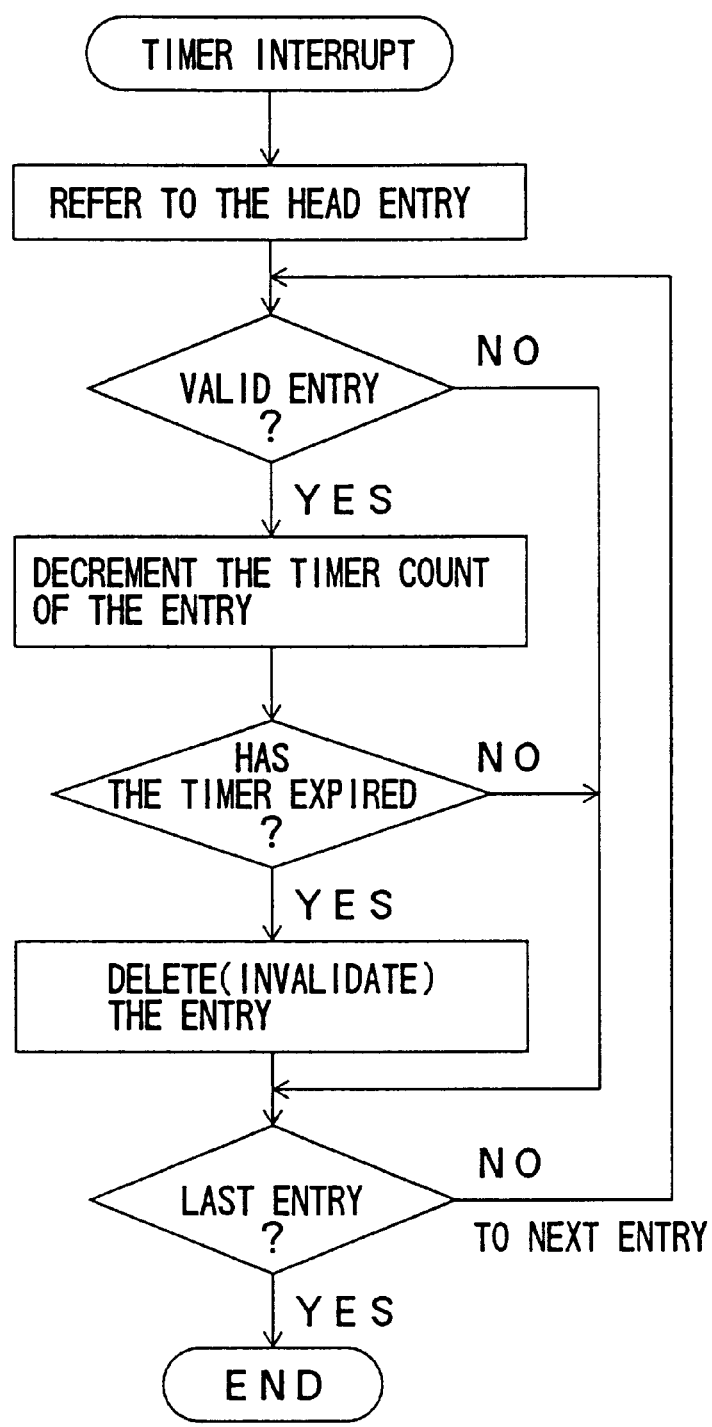
FIG. 9 is a flowchart showing a routing termination operation performed by the gateway apparatus.

FIGS. 6 through 9 are flowcharts showing the packet routing operation in the gateway apparatus according to the present invention. FIG. 6 is a flowchart showing an operation performed by the gateway apparatus when the gateway apparatus receives a packet from a terminal in the local network. FIG. 7 is a flowchart showing an operation performed by the gateway apparatus for routing a packet transmitted by a terminal in the local network to an external network. FIG. 8 is a flowchart showing an operation performed by the gateway apparatus for routing a packet from an external network to a terminal in the local network. FIG. 9 is a flowchart showing a routing termination operation performed by the gateway apparatus.

First, a description will be given of an operation for transmitting a packet from the local network to the external network (see FIG. 6).

(1) The packet transmitted from a terminal in the local network to the external network is received by the local network interface (LAN-I/F) of the gateway apparatus (step S1).

(2) The gateway apparatus determines whether the packet is addressed to the gateway apparatus itself (step S2).

(3) If the packet is not addressed to the gateway apparatus, the packet is routed forward (step S9). If the gateway apparatus is provided with only two interfaces, that is, the local network interface and the external network interface, the packet is of course routed to the external network. An arrangement may be made such that any packet not addressed to the gateway apparatus is routed.

When the gateway apparatus is provided with a plurality of local network interfaces, a determination must be made as to which interface the packet should be routed to. Like any router for performing Layer 3 routing, the gateway apparatus of the invention is capable of determining the destination of a routed packet. In this determination, the gateway apparatus refers to the routing table (not shown) (step S3).

(4) The routing table is referred to so as to find a match with the destination Layer 3 address (the network address x and the host address y).

If no match is found, the routing table is referred to so as to find a match with the network address x of the destination the Layer 3 address. If no such entry is found, the routing table is then searched for an entry for a default route. If the default route entry is found, the routing is performed as specified by that entry.

If a default entry is absent, a determination is made that routing is impossible and the gateway apparatus returns the unreachable message to the source (step S8).

The local network coupled to the gateway apparatus according to the present invention is connected to the external network by terminal connection. Routing information relating to the external network is not delivered to the gateway apparatus according to the routing protocol. While it is conceivable to register the network addresses of the external network in the routing table, such a method is impracticable.

By defining an external network interface (and a default gateway in the external network) as a default route in the routing table, packets can be routed to the external interface. Such an arrangement is identical to a method whereby all packets not having identifiable destination are routed forward.

Thus, the destination of the routed packet is determined (step S4).

(5) When the packet is found in the routing table, the Layer 3 packet header is updated as is done in the ordinary Layer 3 packet routing (step S5).

(6) After the Layer 3 packet header is altered and it is determined that the routing destination is the local network, the packet is transmitted to the proper destination as is done by the ordinary router (step S7).

(7) If the routing destination is the external network interface, the packet is transferred to the external network (step S6). Before the transfer, the packet header is translated as described with reference to FIGS. 5B and 5C, and an appropriate lower-layer process adapted for the interface is performed.

A description will now be given of the transfer process of step S6 for transferring the packet to the external network (see FIG. 7).

When it is determined that the packet should be transferred to the external network, the conversion table is referred to in order to determine whether the combination of the source Layer 3 address, the source upper layer port number, the server Layer 3 address, the server upper layer port number and the upper protocol type of the packet is registered in the conversion table (steps S10–S12).

FIG. 10 shows an example of the conversion table used in the gateway apparatus of the present invention. Each entry in the conversion table includes items for use in the local network: the source address (SA), the source port number (SP), the destination address (DS), the destination port number (DP) and the Layer 4 protocol type identifier. The entry also includes the source port number (SP') for the line interface for connection with the external network. The source address and the destination address are 32-bit integers separated by dots into eight-bit groups. It is to be noted that a unique source port number (SP') is assigned to each entry, that is, each combination of the source address (SA), the source port number (SP), the destination address (DS), the destination port number (DP) and the Layer 4 protocol type identifier.

If it is determined in S11 of FIG. 7 that there is no corresponding combination of the addresses, the port numbers and the protocol type, a port number of the external network interface is dynamically assigned to the checked combination (step S13). A new combination comprising the assigned port number and the checked combination (the source Layer 3 address, the source upper layer port number, the destination Layer 3 address, the destination upper layer port number and the protocol type) is created and registered in the conversion table (step S14).

When the matching combination of the addresses, the port numbers and the protocol type is found in S12, a new port number for the external network interface is dynamically assigned to the matching combination and registered in the conversion table according to the present invention (step S15).

Once the entry is properly supplied to the conversion table, the source address of the originated packet is replaced by the source address (myaddr) for the external network interface provided in the gateway apparatus. The source port number of the packet is replaced by the external network interface port number (xport) registered in the conversion table (step S17). If there is a related error check sequence code in the packet, the code is also updated.

The timer for the entry indicating the target packet is then initialized (S16). Because IP provides connectionless communication, the network cannot know that a communication session has ended. Therefore, it is determined that communication between access points defined by the entry has ended when packets are no longer transported for a predetermined period of time (see FIG. 9).

When the packet header information is properly altered, the packet is transmitted to the external network interface, thus completing the routing operation (step S18).

A description will now be given of packet routing operation for routing a packet from the external network to a terminal of the local network (see FIG. 8).

When a packet arrives from the external network to a terminal in the local network, the gateway apparatus operates as a terminal.

When a packet is received by the gateway apparatus via the external network interface thereof, a determination is made as to whether the destination address of the arriving packet is the Layer 3 address assigned to the external network interface (steps S20, S21). If the answer is negative, the packet is discarded (step S28).

Referring also to FIGS. 5B, 5C and 10, if the answer is affirmative in S21, the conversion table is referred to so as to determine if the conversion table contains an exact combination of the addresses and port numbers of a packet arriving from the external network. The source port number (SP) of the arriving packet is checked against the destination port number (DP) in the table; the source address (SA) is checked against the destination address (DA) in the table; the destination port number (DP) is checked against the external network port number (SP'); and the protocol type in the arriving packet is checked against the protocol type specified in the table (steps S22, S23).

If there is no match, it means that the routing destination of the packet is unknown so that the packet is discarded (step S28).

If it is found in step S23 that the matching combination is found in the conversion table, the source address (SA) and the source port number (SP) are retrieved from the conversion table (step S24).

The timer for the matching entry is initialized (step S25). The timer setting, which is also included in the aforementioned process of transmitting a packet from the local network to the external network, is for the purpose of detecting a termination of a communication session.

The arriving packet is then translated such that the destination port number (DP) is replaced by the source port number (SP) stored in the table at the matching combination; and the destination address (DA) is replaced by the source address (SA) stored in the table at the matching combination. Any related error check sequence code in the packet is also updated.

The packet having the header thereof translated is then transmitted to the local network.

A description will now be given of a dial-up connection method in the gateway apparatus according to the present invention.

The network address of the external network is assigned when a dial-up connection via a telephone line or an ISDN line is established. For example, a link is established in the dial-up connection using a link protocol such as the PPP protocol. Dynamic assignment of the layer address of the interface is performed by using the control procedure provided in the PPP protocol for control of the upper layer.

Several methods of dial-up connection are conceivable. FIGS. 11 through 17 are flowcharts showing dial-up connection methods in the gateway apparatus according to the present invention.

Figure 11:
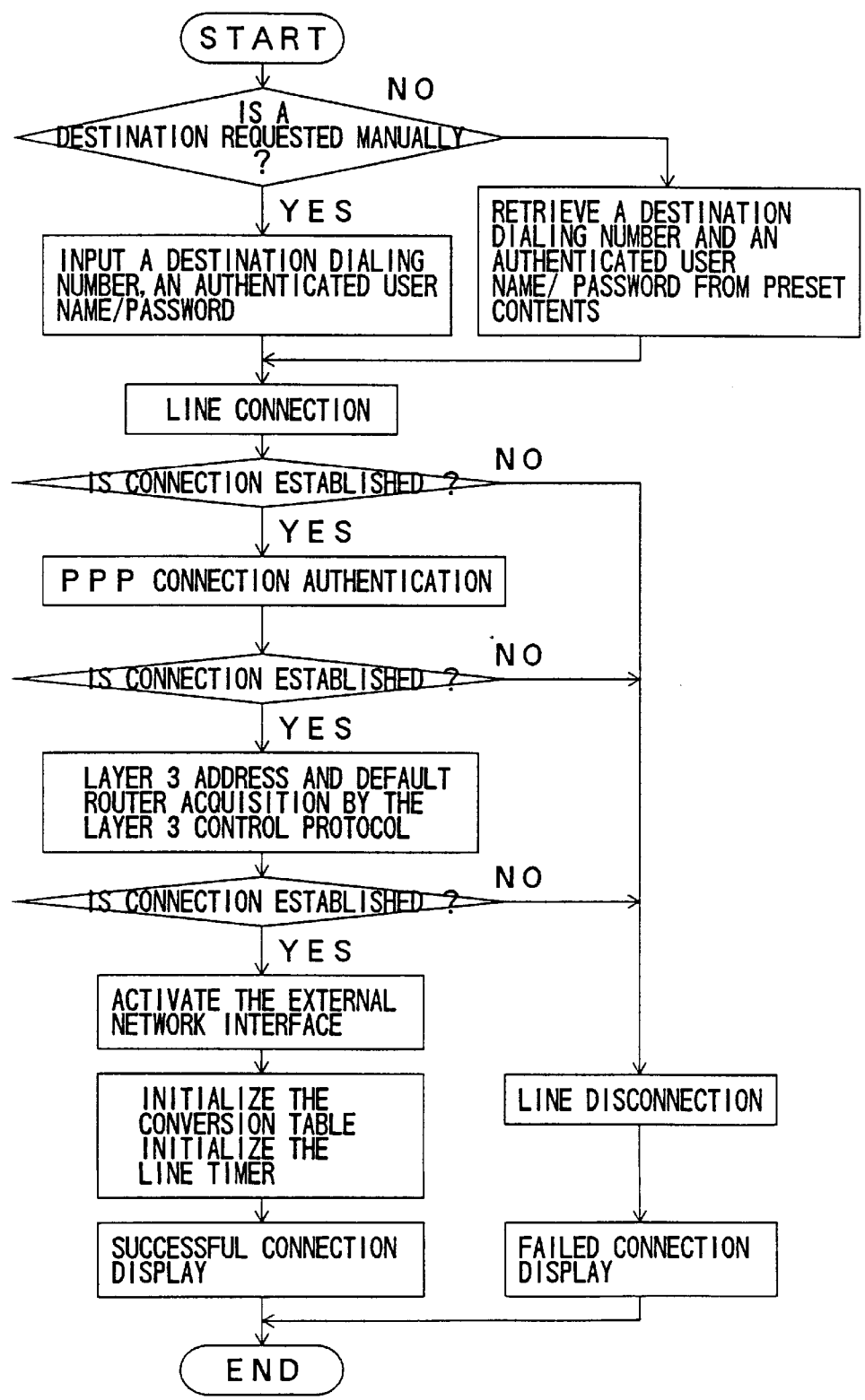
FIG. 11 is a flowchart showing a first dial-up connection method in the gateway apparatus according to the present invention.

FIG. 11 is a flowchart showing a first dial-up connection method in the gateway apparatus according to the present invention. In the first method, a line connection is established by a user manually controlling the gateway apparatus.

Figure 12:
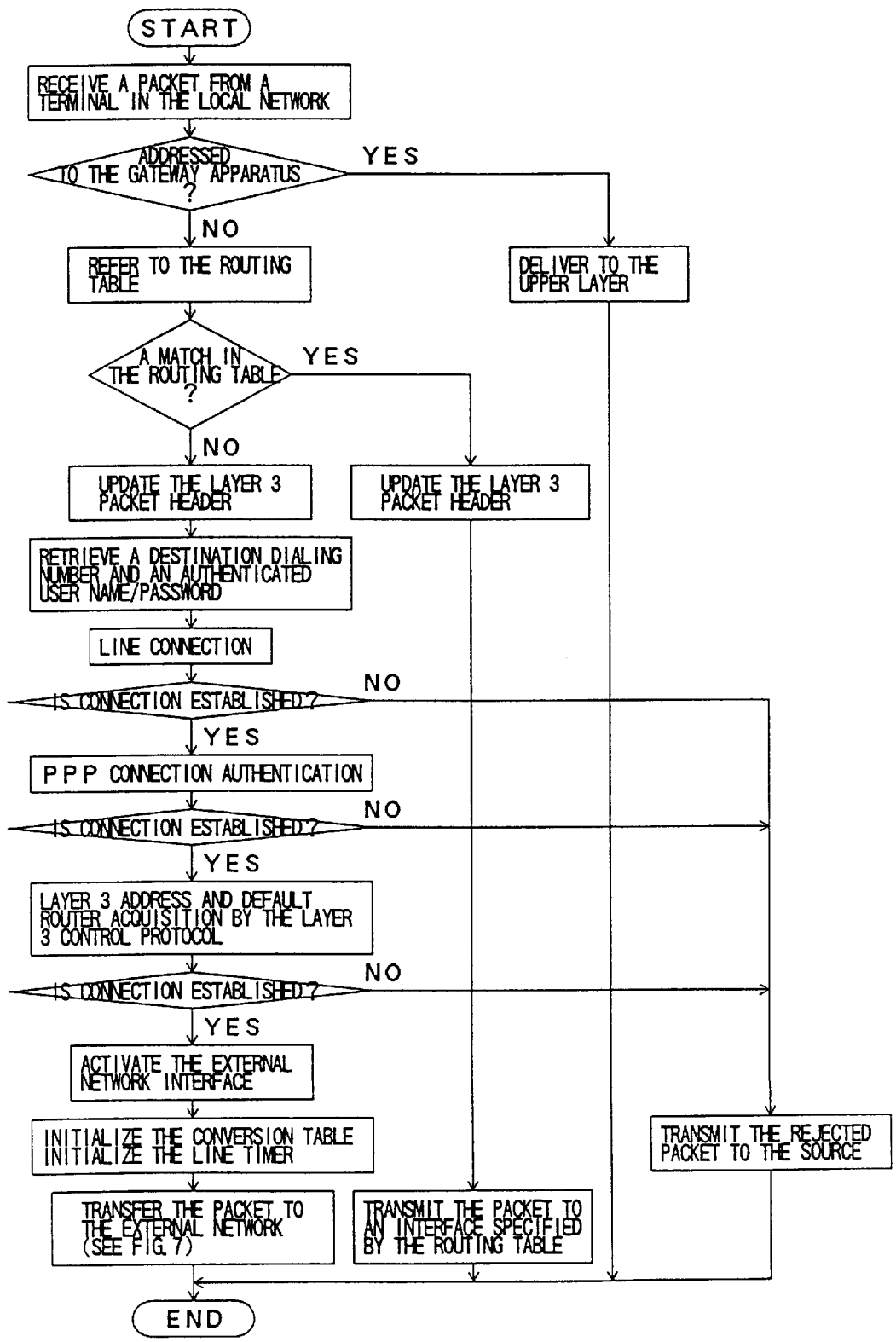
FIG. 12 is a flowchart showing a second dial-up connection method (automatic line connection method) in the gateway apparatus according to the present invention.
Figure 13:
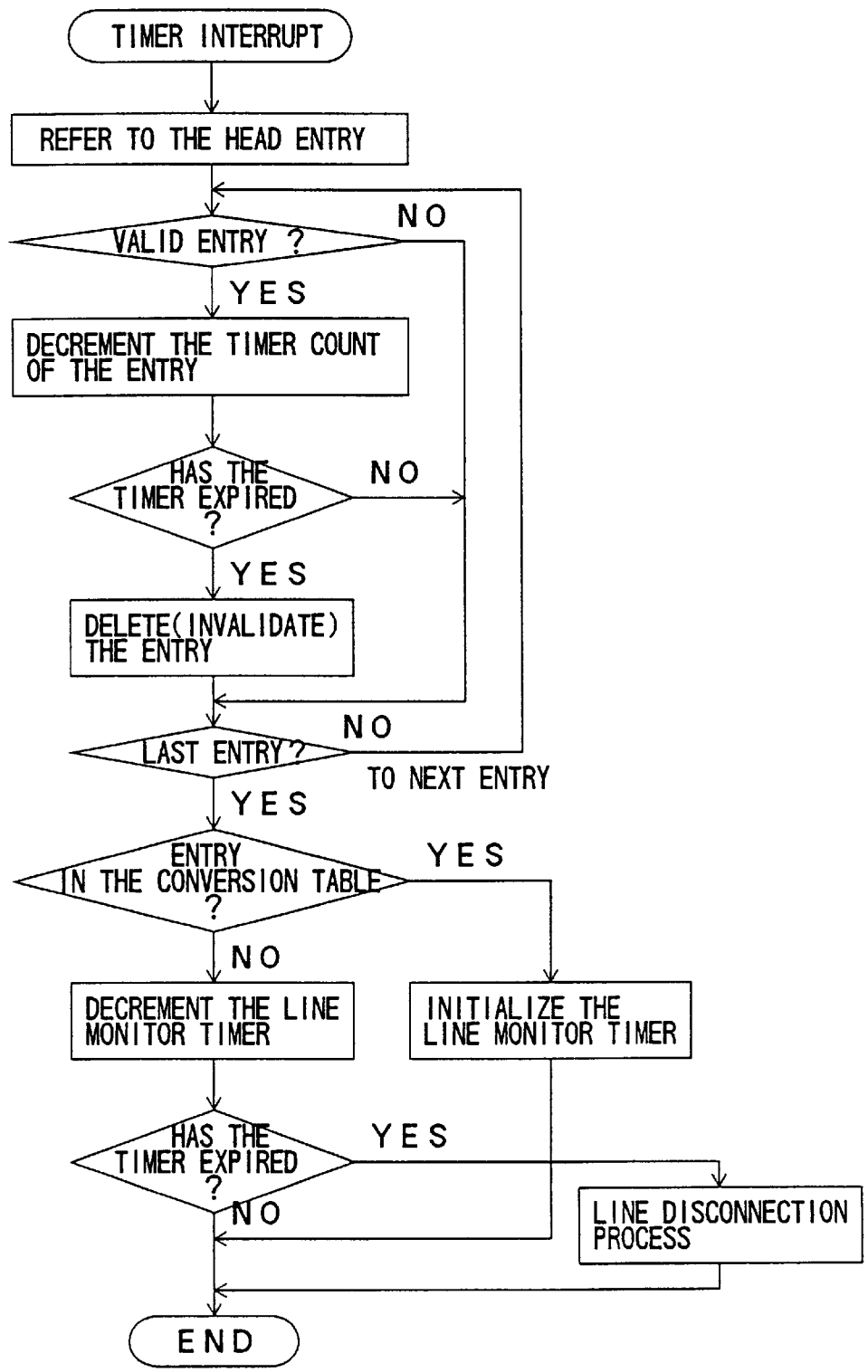
FIG. 13 is a flowchart showing an automatic line disconnection method in the second dial-up connection method of FIG. 12.

FIG. 12 is a flowchart showing a second dial-up connection method (automatic line connection method) in the gateway apparatus according to the present invention. FIG. 13 is a flowchart showing an automatic line disconnection method in the second dial-up connection method of FIG. 12.

In the second method, it is possible to start line connection when the gateway apparatus receives a packet addressed to the external network. In this case, connection destination information (telephone number, a user name and a password for authentication) should be registered in the gateway apparatus.

When the gateway apparatus receives the packet to be routed, a line connection operation is executed in accordance with the registered information. When the connection is started, or when the packet is sent to the external network, the timer is initialized. When the timer detects that a predetermined time has elapsed, the line is disconnected (see FIG. 13). The timer value can be either fixed or set depending on the conditions.

Figure 14:
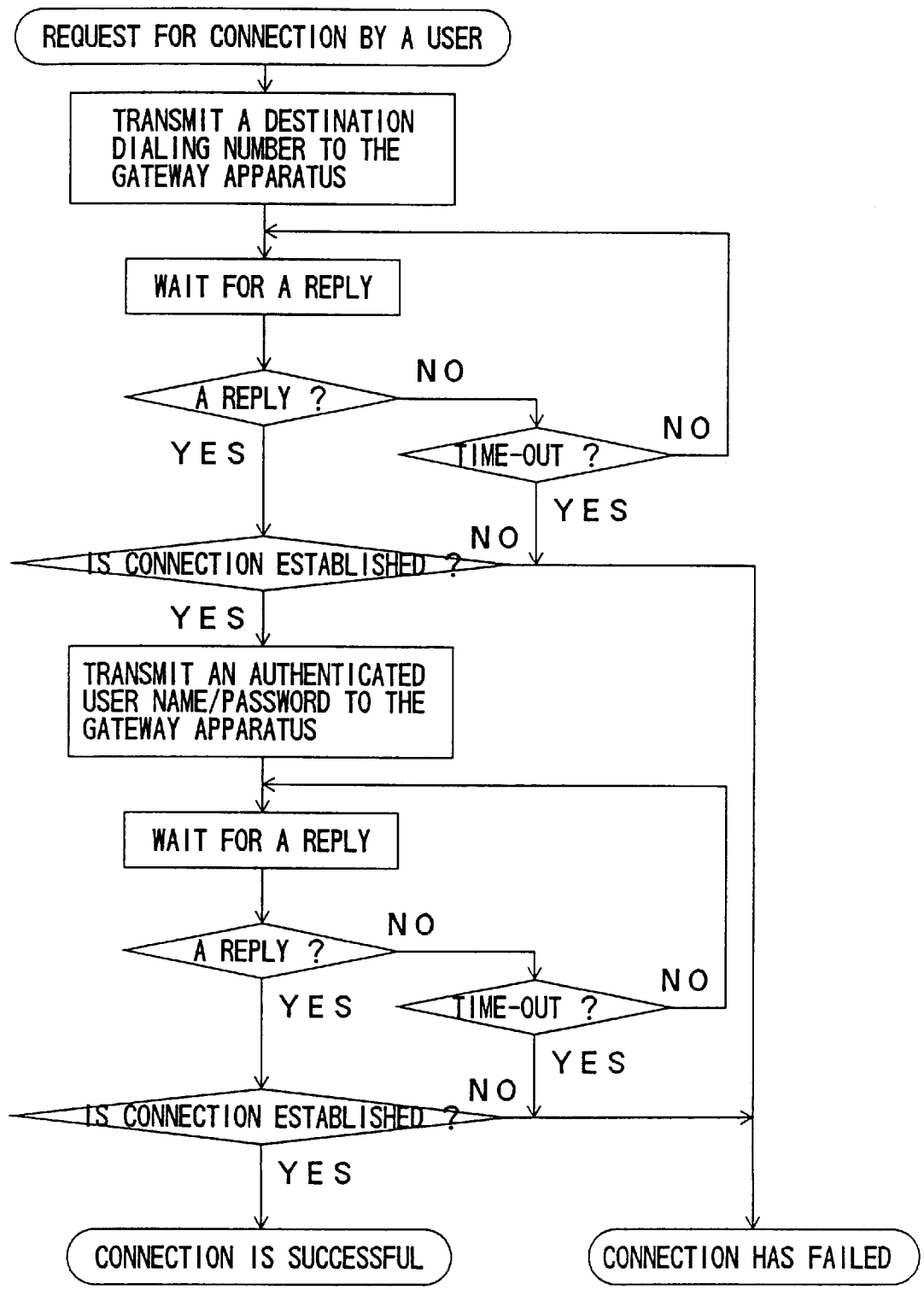
FIG. 14 is a flowchart showing a procedure executed by a terminal in a third dial-up connection method (method of connection driven by a request from a terminal) in the gateway apparatus according to the present invention.
Figure 15:
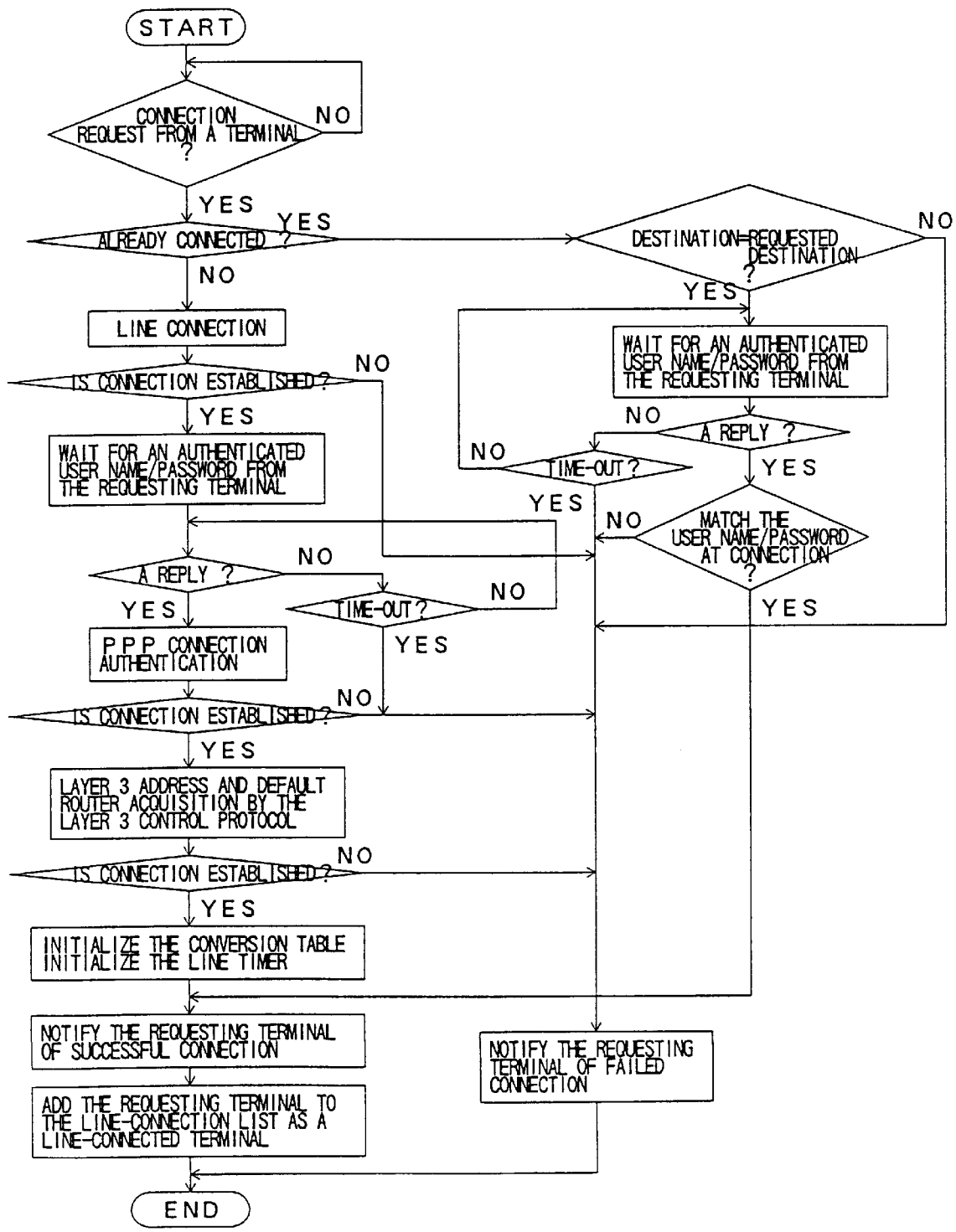
FIG. 15 is a flowchart showing a procedure executed by a gateway apparatus in the third dial-up connection method.
Figure 16:
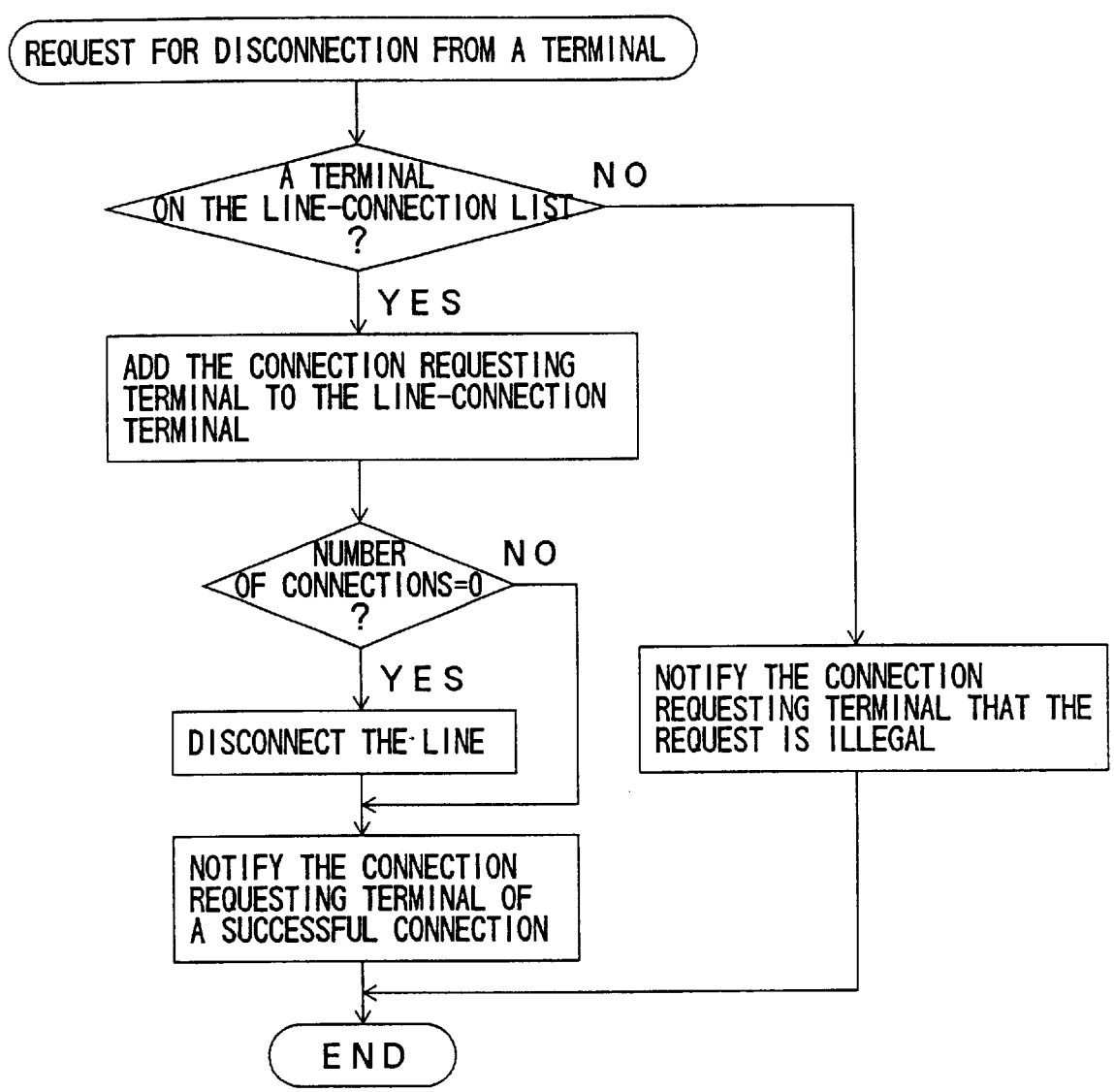
FIG. 16 is a flowchart showing a line disconnection procedure executed by the gateway apparatus in the third dial-up connection method shown in FIG. 15.
Figure 17:
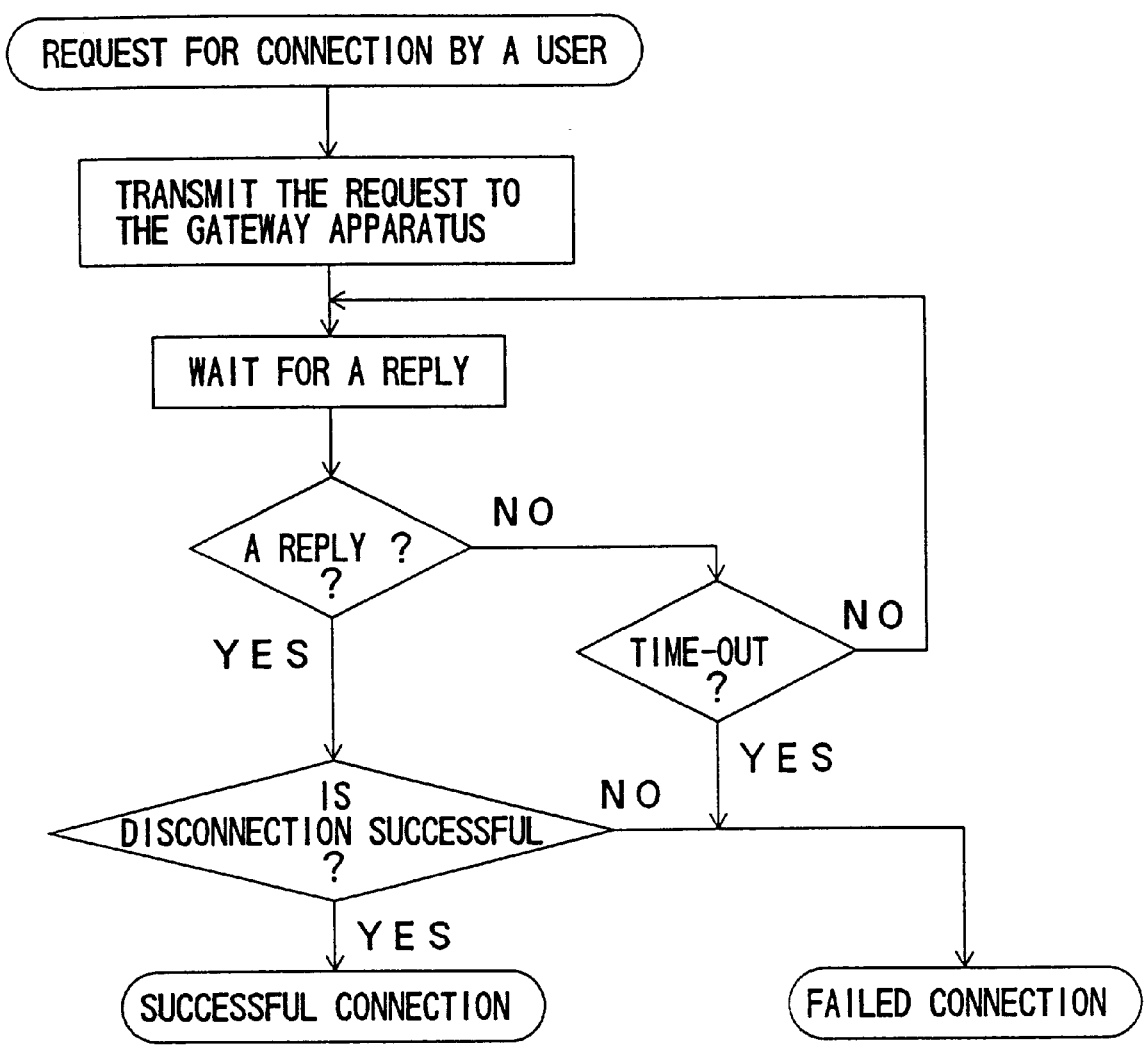
FIG. 17 is a flowchart showing a line disconnection procedure executed by the terminal in the third dial-up connection method shown in FIG. 14.

FIG. 14 is a flowchart showing a procedure executed by a terminal in a third dial-up connection method (method of connection driven by a request from a terminal) in the gateway apparatus according to the present invention. FIG. 15 is a flowchart showing a procedure executed by a gateway apparatus in the third dial-up connection method. FIG. 16 is a flowchart showing a line disconnection procedure executed by the gateway apparatus in the third dial-up connection method shown in FIG. 15. FIG. 17 is a flowchart showing a line disconnection procedure executed by the terminal in the third dial-up connection method shown in FIG. 14.

The background of the third method will be described. Recently, an increasing number of terminals use an operating system equipped to control hardware for dial-up connection. The third method assumes that a user terminal has built-in driver software for providing dialing information and authentication procedure to the gateway apparatus via the local network (see FIG. 14). The gateway apparatus receiving such information from the user terminal performs dial-up connection, user authentication and line disconnection (see FIG. 15).

It is ensured that, when a second terminal requests a connection after the connection responsive to a first terminal is established, the second terminal is notified that the requested connection is properly established irrespective of the processes actually performed. Thus, the connection requests from two terminals are maintained in the gateway apparatus. When a connection request demanding the same condition occurs subsequently, the requesting terminal is notified in the same manner as above and the count of connection requests is incremented. A connection request demanding a different condition is made to fail.

When a requesting terminal requests a disconnection, the count is decremented. When the count has reached 0, the line is actually disconnected (see FIGS. 16 and 17). In this way, each terminal can be connected to the external network via the gateway apparatus using the same operation as used for direct line connection.

A description will now be given of a variation of the gateway apparatus according to the present invention. In the foregoing description, it is assumed that a terminal in the local network accesses the external network, whereupon the external network replies to the terminal. Thus, in the event that the external network returns a reply to the terminal, the destination terminal can be easily detected by referring to the conversion table.

However, when the external network accesses a terminal in the local network for the first time for communication, or when the client-side access point (port number) is reported via a separate communication path, the conversion as shown in FIG. 8 cannot be used instantly.

Figure 18:
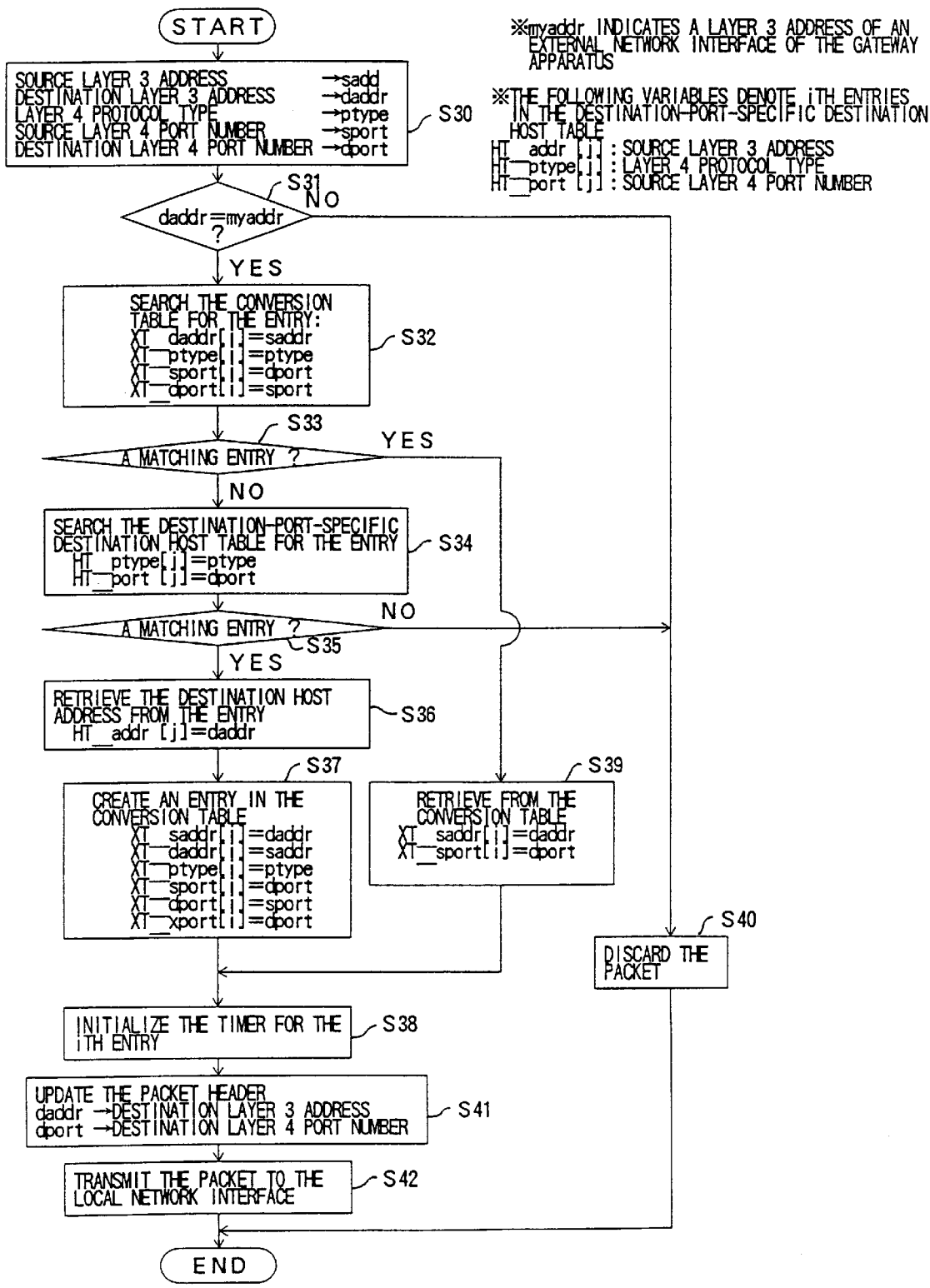
FIG. 18 is a flowchart of an operation of the gateway apparatus routing a packet from the external network to a terminal in the local network.

FIG. 18 is a flowchart of an operation of the gateway apparatus routing a packet from the external network to a terminal in the local network. FIG. 19 shows a destination-port-specific destination host table used in the flowchart of FIG. 18.

When it is expected that the external network accesses a terminal in the local network to start communication, the local network Layer 3 address and the upper layer port number of the terminals likely to be accessed by the external network are registered in the destination-port-specific destination host table shown in FIG. 19 and provided in the gateway apparatus.

Before converting packet received by the gateway apparatus of this variation, the conversion table shown in FIG. 10 is referred to such that the source port number (SP) of the received packet is checked against the destination port number (DP) in the table; the source address (SA) is checked against the destination address (DA) in the table; the destination port number (DP) is checked against -the external network port number (SP'); and the upper protocol type specified in the received packet is checked against the upper protocol type in the table (steps S30–S32). A determination is made as to whether the conversion table contains a combination (entry) that matches the received packet If the conversion table contains a match, it is determined that the received packet is destined from the external network to the local terminal at the local network which previously sent a packet to the external network. The packet is then processed according to the steps S24 through S28 of FIG. 8 (steps S39, S38, S41 and S42).

If the conversion table does not contain a match, it is determined that the received packet is possibly destined well-known services. The destination-port-specific destination host table as shown in FIG. 19 is searched for an entry that matches the received packet (step S34). More specifically, the upper protocol type specified in the received packet is checked against the upper protocol type in the table; and the destination port specified in the received packet is checked against the destination port in the table. If it is determined in step S35 that a matching entry is found, the contents of the matching entry are registered in the conversion table (steps S36, S37). The external network port number in the received packet is used as the source port number when the packet is forwarded.

Subsequently, the destination address of the packet is replaced by the Layer 3 address of a terminal of the local network and the destination port number of the packet is replaced by the destination port number in the created entry (step S41). After an error check sequence is updated appropriately, the packet is transferred to the local network (step S42). When the packet is received by the terminal in the local network, a reply from the terminal is subject to the packet header translation (conversion) described already and is transmitted to the access point outside the external network interface. In this way, end-to-end communication takes can be started.

In the conversion (translation) of the present invention, the likelihood of diminishing the port number resource exists. When the port number area runs short, it is possible to report the shortage of the port number area to the packet source by returning two messages to the packet source using the network control protocol. More specifically, assuming that the TCP/IP program is employed, an ICMP message may be sent.

Figure 20:
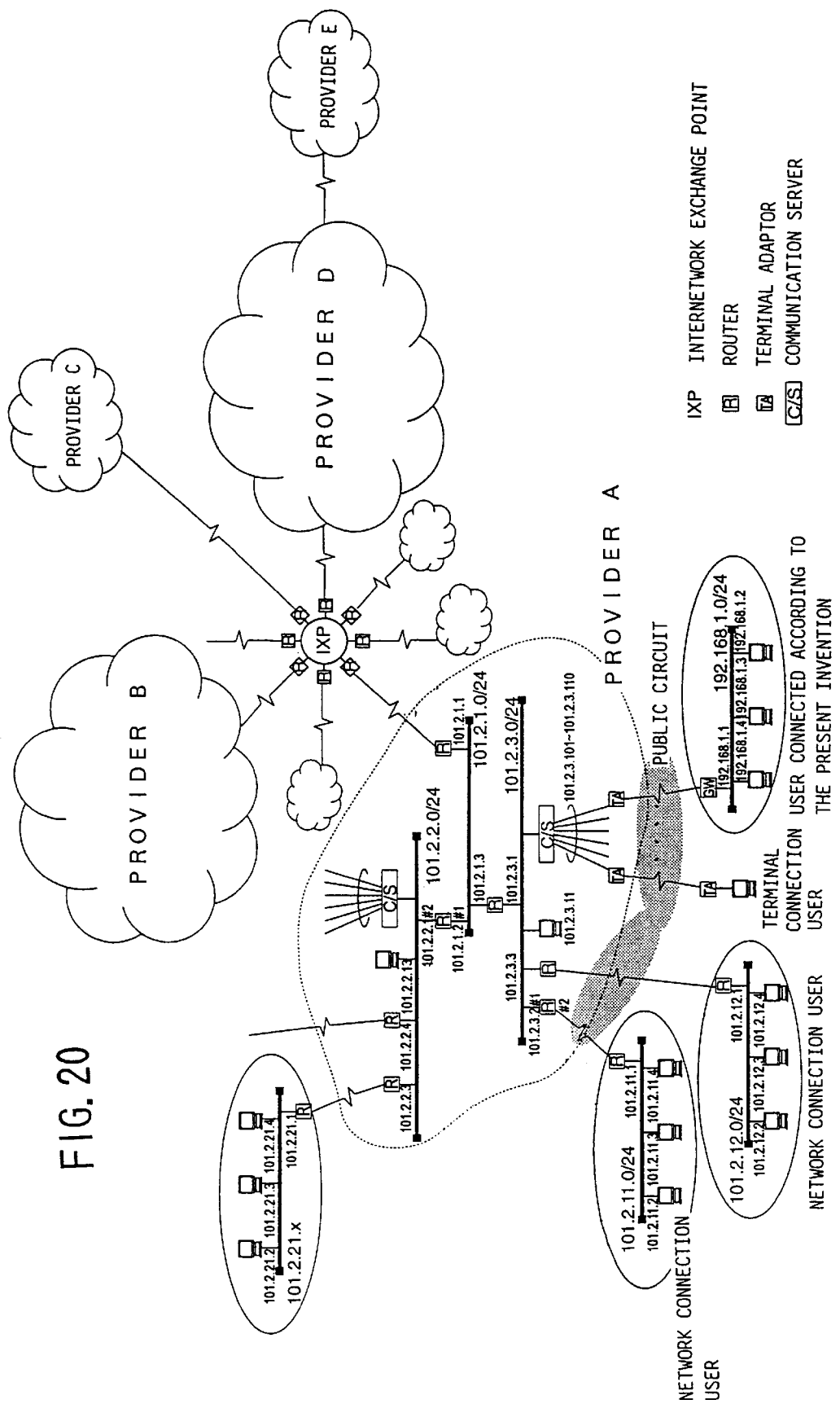
FIG. 20 shows how users of the gateway apparatus according to the present invention are connected to the Internet.

FIG. 20 shows how a user of the gateway apparatus according to the present invention is connected to the global Internet.

The present invention is not limited to the above described embodiments, and variations and modifications may be made without departing from the scope of the present invention.

What is claimed is:

1. A gateway apparatus provided with a local network interface for a local network and a dial-up connection interface for establishing a dial-up connection between said local network and an outside network, the gateway apparatus routing packets between said local network and said outside network and comprising:

first converting means for converting a first header of each of packets transmitted from at least one of terminals of said local network to said outside network, into a header assigned to said gateway apparatus, wherein said first header includes a source address of said at least one of the terminals, the source address being converted by said first converting means into a source address assigned to the gateway apparatus in the outside network;

a conversion table for storing entries referred to by said first converting means in conversion, and second converting means for converting a second header of packets transmitted by said outside network to said local network into a header for the terminals of said local network by referring to one of the entries of said conversion table, wherein said second header includes a destination address of the gateway apparatus in the outside network, said destination address being converted by said second converting means into a source address stored in said one of the entries of said conversion table;

said gateway apparatus operating as a Layer 3 routing apparatus for said local network and operating as a terminal for said outside network, wherein said first header includes a Layer 3 address and a host layer port ID; and said first converting means converts the Layer 3 address of said first header of said packets transmitted to said outside network into the Layer 3 address assigned to said gateway apparatus and converts the upper layer port ID of said first header into a dynamically determined host layer port ID.

2. The gateway apparatus as claimed in claim 1, wherein said second converting means executes conversion when it is determined that said header of said packets received from said outside network has entries thereof registered in said conversion table.

3. The gateway apparatus as claimed in claim 1, further comprising first control means for deleting entries that are not referred to for a predetermined period of time from said conversion table and for accordingly determining to terminate communication indicated by the deleted entries.

4. The gateway apparatus as claimed in claim 1, further comprising second control means for controlling said dial-up connection interface to establish a dial-up connection with said outside network responsive to an operation by a user.

5. The gateway apparatus as claimed in claim 1, further comprising third control means for controlling said dial-up connection interface to establish a dial-up connection with said outside network when the dial-up connection is needed to transmit packets from said local network to said outside network.

6. The gateway apparatus as claimed in claim 1, further comprising fourth control means for notifying, when a first dial-up connection is established responsive to an instruction from a first terminal and when another instruction for a second dial-up connection is subsequently issued from a second terminal requiring the same connection condition, the second terminal that the second dial-up connection is properly established irrespective of an actual dial-up connection process.

7. The gateway apparatus as claimed in claim 1, further comprising fifth control means for discontinuing a dial-up connection with said gateway apparatus when all the entries used in packet routing are deleted.

8. The gateway apparatus as claimed in claim 1, further comprising third converting means for converting the address of said packets from said outside network accessing said local network into a predetermined Layer 3 address irrespective of the content of said conversion table.

9. The gateway apparatus as claimed in claim 1, further comprising sixth control means for returning a non-delivery notice to the terminal transmitting said packets, when the converting process cannot be executed.

10. A packet routing method for performing network-layer packet routing between a local network and an outside network, using a gateway apparatus provided with a local network interface for said local network and a dial-up connection interface for establishing a dial-up connection between said local network and said outside network;

said packet routing method comprising the steps of:

(a) converting a first header of packets transmitted from at least one of terminals of said local network to said outside network into a header assigned to said gateway apparatus, by referring to one of entries of a conversion table, wherein said first header includes a source address of said at least one of the terminals, the source address being converted into a source address assigned to the gateway apparatus in the outside network; and (b) converting a second header of packets transmitted from the outside network to the local network, into a header for the terminals of the local network by referring to one of the entries of said conversion table, wherein said second header includes a destination address of the gateway apparatus in the outside network, said destination address being converted into a source address stored in said one of the entries of said conversion table, so as to operate the gateway apparatus as a Layer 3 routing apparatus for the local network and as a terminal for the outside network, wherein said first header includes a Layer 3 address and a host layer port ID, said packet routing method further comprising the steps of:

converting the Layer 3 address of said first header of said packets transmitted to said outside network into a Layer 3 address assigned to said gateway apparatus; and converting the upper layer port ID of said first header into a dynamically determined host layer port ID.

11. The packet routing method as claimed in claim 10, wherein said step (b) further comprises the step of determining whether conversion is to be performed depending on whether a content of said packets received from said outside network is registered in said conversion table.

12. The packet routing method as claimed in claim 10, further comprising the steps of:

deleting entries that are not referred to for a predetermined period of time from said conversion table; and determining to terminate communication indicated by the deleted entries.

13. The packet routing method as claimed in claim 10, further comprising the step of:

controlling said dial-up connection interface to establish a dial-up connection with said outside network responsive to an operation by a user.

14. The packet routing method as claimed in claim 10, further comprising the step of controlling said dial-up connection interface to establish a dial-up connection with said outside network when the dial-up connection is needed to transmit packets from said local network to said outside network.

15. The packet routing method as claimed in claim 10, further comprising the step of notifying, when a first dial-up connection is established responsive to an instruction from a first terminal and when another instruction for a second dial-up connection is subsequently issued from a second terminal requiring the same connection condition, the second terminal that the second dial-up connection is properly established irrespective of an actual dial-up connection process.

* * * * *